United States Patent [19]

Laser

[11] Patent Number: 4,500,776
[45] Date of Patent: Feb. 19, 1985

[54] METHOD AND APPARATUS FOR REMOTELY READING AND DECODING BAR CODES

[76] Inventor: Vadim Laser, 994 Twincrest Ct., Cincinnati, Ohio 45231

[21] Appl. No.: 439,988

[22] Filed: Nov. 8, 1982

[51] Int. Cl.³ .............................................. G06K 7/10
[52] U.S. Cl. ................................... 235/162; 235/454; 235/494; 382/65
[58] Field of Search ............... 235/463, 462, 440, 494, 235/464, 454, 456; 382/68, 65, 66, 67

[56] References Cited

U.S. PATENT DOCUMENTS

| | | | |
|---|---|---|---|
| 3,532,859 | 9/1967 | Laplume | 235/462 |
| 3,534,333 | 10/1970 | Keiper, Jr. | 382/65 |
| 3,853,403 | 12/1974 | Bentley | 356/71 |
| 4,029,944 | 6/1977 | Trenkamp | 382/65 |
| 4,074,115 | 2/1978 | Sigiura et al. | 235/462 |
| 4,096,992 | 6/1978 | Nojiri et al. | 235/462 |
| 4,114,030 | 9/1978 | Nojiri et al. | 235/464 |
| 4,135,663 | 1/1979 | Nojiri et al. | 235/463 |
| 4,136,821 | 1/1979 | Sugiura et al. | 235/462 |
| 4,140,271 | 2/1979 | Nojiri et al. | 235/440 |
| 4,146,046 | 3/1979 | Dobras | 235/494 |
| 4,147,295 | 3/1979 | Nojiri et al. | 235/463 |
| 4,160,522 | 7/1979 | Dikinis | 235/454 |
| 4,282,425 | 8/1981 | Chadima, Jr. et al. | 235/462 |
| 4,354,101 | 10/1982 | Hester et al. | 235/463 |

OTHER PUBLICATIONS

I.B.M. Tech. Disclosure Bul., vol. 13, No. 3, Aug. '70, p. 823.

Primary Examiner—Gene Z. Rubinson
Assistant Examiner—Robert G. Lev
Attorney, Agent, or Firm—Hill, Van Santen, Steadman & Simpson

[57] ABSTRACT

A remote bar code reading camera for detecting dark and light areas of a bar code carried on an object disposed at a distance from the camera has a substantially continuously operating non-coherent light source for illuminating the bar code, an optical arrangement with a rectangular aperture for directing the reflected light from the bar code onto an image sensor, the optical arrangement having a depth of field such that reflections from remote objects are accurately transmitted to the image sensor, and a processing circuit for shaping and analyzing the signals from the image sensor. The processing circuit includes an external random access memory which, during a first portion of a signal processing cycle is used with loading circuitry to store digital information corresponding to the scanned bar code, and during a second portion of a processing cycle is utilized as the working memory for a microcomputer for decoding the information. The camera has an interface means for transferring the decoded data to an external device.

18 Claims, 7 Drawing Figures

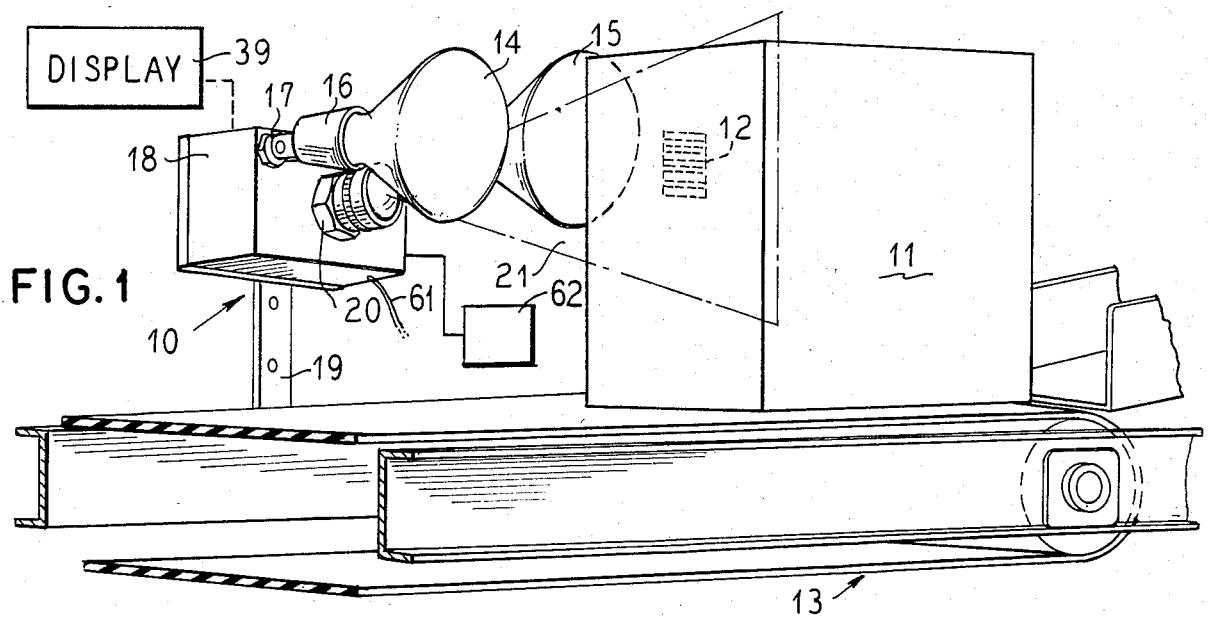
FIG. 1
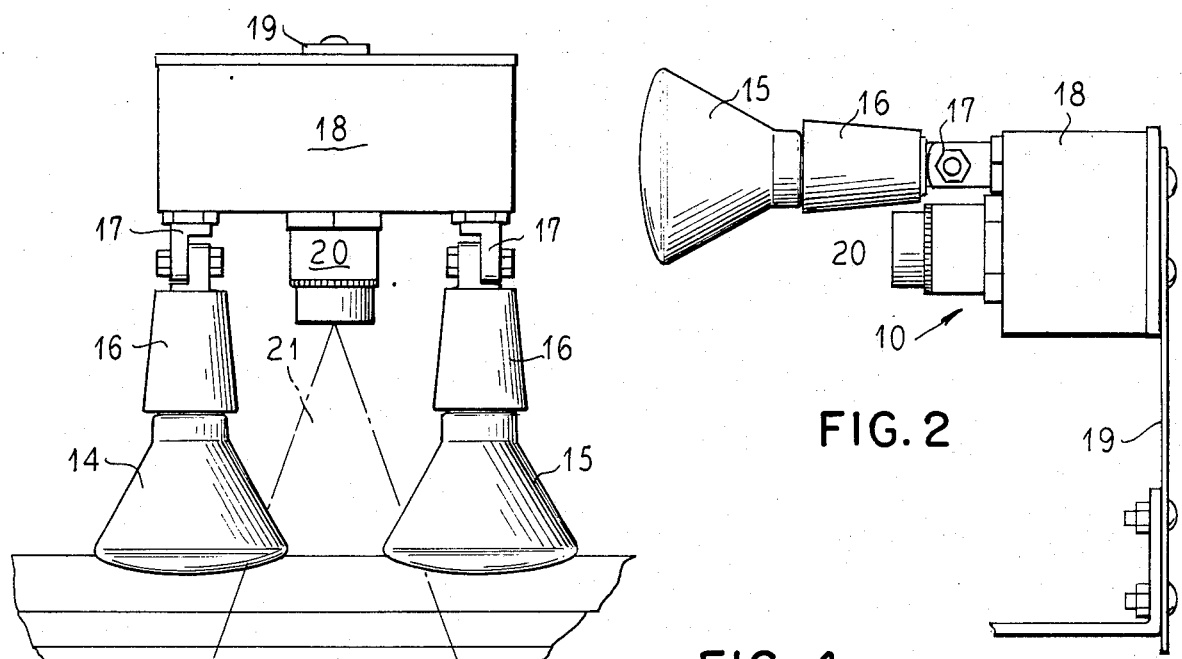
FIG. 3
FIG. 2
FIG. 4
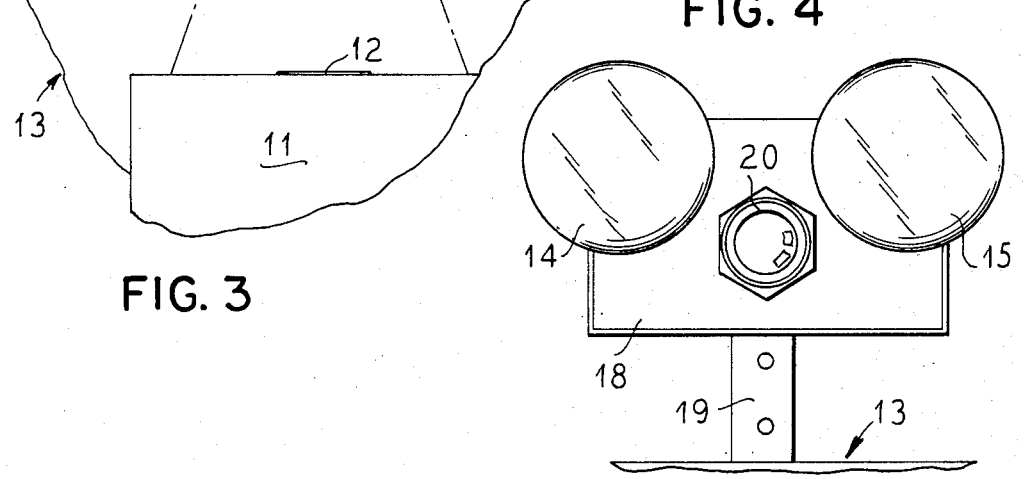

METHOD AND APPARATUS FOR REMOTELY READING AND DECODING BAR CODES

BACKGROUND OF THE INVENTION

1. Field of the Invention

The present invention relates to devices for reading a bar code, and in particular to a bar code reading camera which is remotely disposed with respect to the bar code to be read and which operates so as to substantially continuously scan a region through which a plurality of bar codes to be read are moved.

2. Description of the Prior Art

Bar code readers having a sufficient depth of field to read bar codes at a distance are known in the art and employ a laser tube as a light source and are commonly referred to as laser scanners. Laser scanners generally operate by directing a laser beam at a rotating drum or multi-faced mirror or hologram to scan the beam across a bar code. The reflected scattered light is incident on a photocell which generates a corresponding voltage so that a voltage pattern with respect to the distance along the length of the bar code is developed. Because the rotational speed of the drum or mirrors or hologram is known, the reflectivity-length relationship can be converted to a voltage-time relationship, which is used to decode the information contained in the bar code. Because of the capability of reading bar codes at a distance, laser scanners are frequently employed in industrial applications to read bar codes on a large number of items moving past the reader, such as on a conveyor.

Such laser scanners have several disadvantages. The rotating drum or mirrors and the drive means therefor involve moving parts subject to wear and requiring servicing. The laser tube used in such scanners has a limited life and the devices embodying such tubes are complex and expensive. Very accurate means are required to correlate the rotation of the drum or mirror with the decoding circuitry in order to precisely identify the reflection pattern with the distance along the length of the bar code, making laser scanners sensitive to vibration. Finally because laser scanners necessarily employ highly concentrated coherent radiation, which is directed across a relatively open area, such devices pose a safety hazard to workers in the area.

Portable bar code readers which employ a light source other than a laser are also known. Such conventional portable bar code readers, however, do not have a depth of field sufficient to scan a bar code which is disposed some distance from the optical scanning means. Such conventional devices generally utilize a wand or other hand held instrument which is manually moved across the bar code in contact therewith or in close proximity thereto, the reflected light being incident on a photodiode array which is electronically scanned. Such conventional devices also generally employ an illumination means in the form of a flash or strobed light source so that the bar code is only momentarily illuminated. Such portable units, in addition to a compact size, sacrifice processing speed and depth of field in order to minimize the number and size of the components comprising the device.

Because of the lack of suitable depth of field and the low power, flashed illumination associated with such conventional bar code readers, those devices are not suitable for industrial use in, for example, inventory control, which requires substantially continuous scanning of a large number of successive bar codes. In such applications, it is not practical to manually pass the illumination source over each individual bar code, as is required by portable reader models. Moreover, such portable models cannot be easily adapted to existing assembly line installations wherein the frequency with which the different bar codes are to be read is not known in advance and therefore cannot be precisely coordinated with the flash necessary in such conventional readers to illuminate the bar code.

SUMMARY OF THE INVENTION

It is an object of the present invention to provide a bar code reading apparatus having sufficient depth of field to scan a bar code remotely disposed with respect to the apparatus using standard incandescent lamps as a light source and a method for decoding the bar code.

It is a further object of the present invention to provide a bar code reading apparatus which operates substantially continuously so as to scan bar codes moving in succession through the field of view of the apparatus.

Another object of the present invention is to provide a bar code reading apparatus which is suited for industrial use and can be easily added to existing package-moving structures.

The above objects are inventively achieved in a bar code reading apparatus having a non-coherent light source for illuminating a bar code to be read and using a photodiode array which is electronically cyclically scanned to provide an analog signal, which is converted into a binary signal for subsequent decoding of the bar code information. The device has a random access memory which operates on a time sharing basis, being first loaded with information from the photodiode array during a loading stage of a processing cycle, and being subsequently used as the working memory for a microcomputer during a decoding stage of the cycle.

The bar code reading device disclosed and claimed herein achieves a sufficient depth of field for reading bar codes at a distance heretofore obtained only by laser scanners, but has none of the disadvantages associated with laser scanners and is significantly simpler in construction and less expensive than such laser scanners. The device achieves non-contact reading of bar codes with a large depth of field and a wide field of view, thereby permitting reading of bar code labels of large dimensions. The working distance between the device and the bar code label can be adjusted to accommodate different installation formats. The unit is tolerant to vibration and has no moving parts. The unit is also tolerant to angular displacement of the label and to many print imperfections. Additionally, the device can read codes through transparent glass or film and can read different colors.

DESCRIPTION OF THE DRAWINGS

FIG. 1, is a perspective view of a bar code reading device constructed in accordance with the principles of the present invention installed for operation in combination with a typical package conveying device.

FIG. 2 is a side view of the bar code reading device shown in FIG. 1.

FIG. 3 is a plan view of the bar code reading device shown in FIG. 1.

FIG. 4 is a front view of the bar code reading device shown in FIG. 1.

DESCRIPTION OF THE PREFERRED EMBODIMENTS

Figure 5:
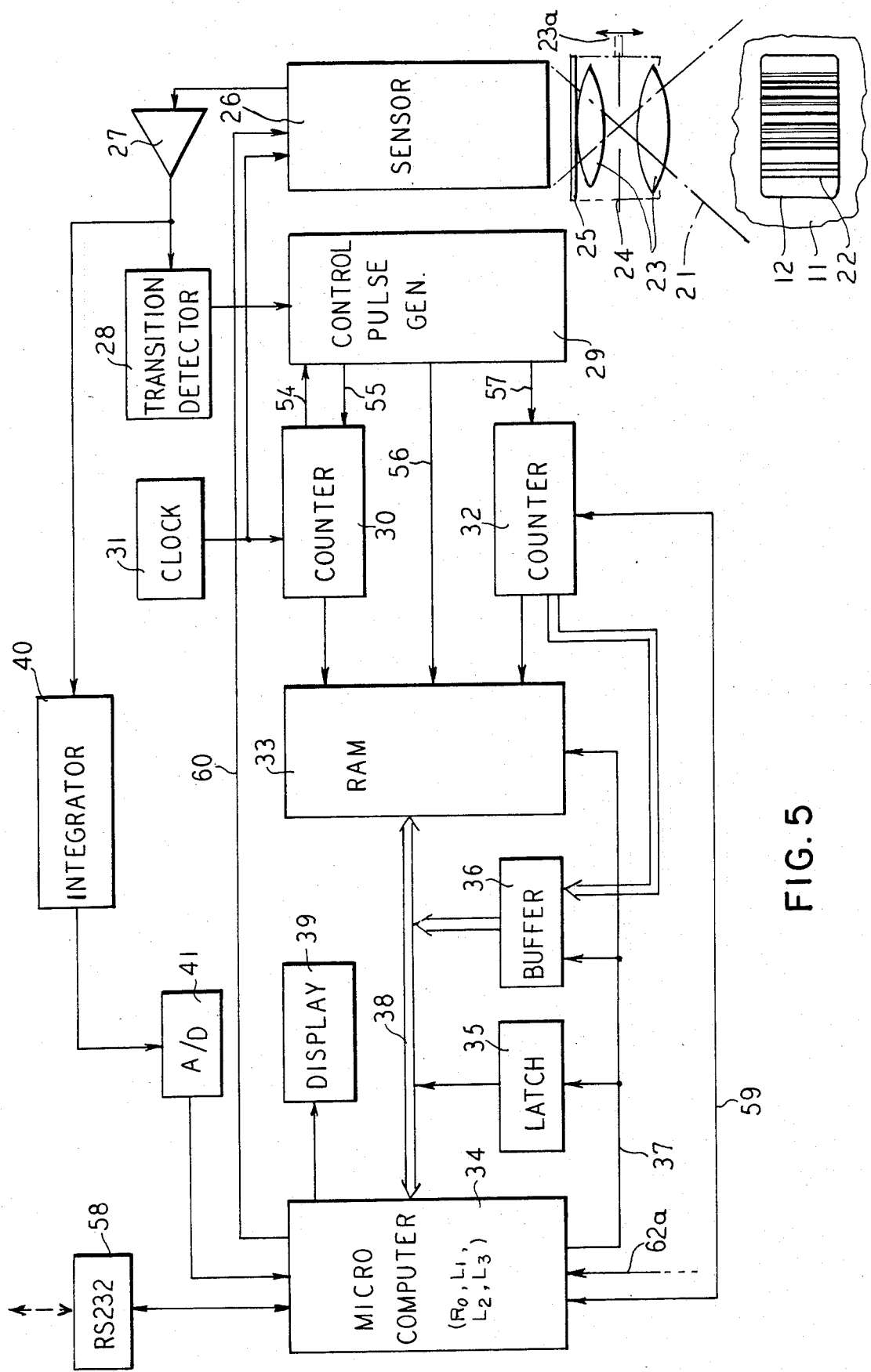
FIG. 5 is a schematic block diagram of a circuit for analyzing signals resulting from scanning a bar code constructed in accordance with the principles of the present invention.

A remote bar code reading unit constructed in accordance with the principles of the present invention is shown at 10 in FIG. 1 installed for use in combination with a conventional workpiece transport means 13. As shown in FIG. 1, the transport means 13 may be a conveyor belt, however, the remote bar code reading unit 10 may be utilized in combination with any means which moves an item 11 having a bar code label 12 thereon through the field of view 21 for the unit 10. The unit 10 has a housing 18 on which an optical means 20 and two lamps 14 and 15 are mounted. Each lamp 14 and 15 is supported by a socket 16 attached to the housing 18 by pivotable connections 17, so that the positions of the lamps 14 and 15 can be adjusted to suitably illuminate the field of view 21 of the optical means 20.

The housing 18 contains a light-sensitive image sensor and associated circuitry for decoding the information contained in the bar code and also contains an interface means for transferring the decoded data to an external device (not shown). The unit 10 may be connected to a display device 39, which may be disposed at any location, and need not be at the same location as the unit 10. The unit 10 is supplied with line voltage over line 61 for operating the lamps 14 and 15 and, after being suitably reduced, for operating the circuitry contained in the housing 18.

The unit 10 is stationarily supported by a support member 19 with respect to the transport means 13, so that items 11 having a bar code label 12 to be read move through the field of view 21 of the optical means 20. The optical means 20 has a sufficient depth of field so that the bar code label 12 is focused onto an image sensor (shown in FIG. 5), thereby permitting accurate scanning of items 11 remotely disposed with respect to the unit 10. Additionally, the unit 10 is continuously supplied with line voltage and therefore operates substantially continuously, so that the lamps 14 and 15 are substantially continuously illuminated so that the unit 10 is ready to scan and decode a bar code 12 at all times. This permits the items 11 carrying the bar code label 12 to be randomly disposed along the transport means 13, and no means is necessary to coordinate the operation of the unit 10 to the movement of the items 11 through the field of view 21. The unit 10 may be used in combination with a proximity sensor 62 which provides a signal to a microprocessor in the unit 10 signifying that an item 11 has no label or the label is unreadable, so that appropriate steps may be taken. The term "continuous" as used herein is in contrast to flashing or discontinuous operation as is exhibited by conventional readers using a photodiode array.

Additional views of the unit 10 are shown in FIGS. 2, 3 and 4.

As shown in FIG. 1, the field of view 21 is significantly larger than the expected size of the bar code symbol 12, and in fact may be four to ten times the size of the actual label 12. As stated above, the unit 10 utilizes standard ac line power, and, because size is not a limiting factor, may be adapted to many different types of industrial uses. For most uses, the optical means 20 includes lenses having a focal length of approximately 50 millimeters with a rectangular aperture. As described below, the processing circuitry can process information from a scanned bar code in a time of approximately 3 milliseconds, which may be further reduced when necessary. This is in contrast to a processing time of approximately 50 milliseconds necessary for portable scanning devices.

The use of a rectangular or slit aperture (shown at 24 in FIG. 5) in the optical means 20 achieves three advantages. The rectangular aperture increases the depth of field without sacrificing resolution in the readying direction (which is the direction of the bar code along which the alternating dark and light bars are encountered), increases the sensitivity of the optical means 20, and functions to blur lines transverse to the reading direction. The unit 10 can accurately read a good quality label 12 at a distance (depth of field) up to 36" (91.44 cm). The rectangular aperture gives the unit 10 anisotropic reading capabilities as opposed to isotropic capabilities achieved with circular apertures. The rectangular aperture increases the signal power admitted to the image sensor, in comparison with a circular aperture having a diameter equal to the height of the rectangular aperture, by a factor roughly equal to the length of the rectangular aperture divided by its height, with no loss of resolution in the reading direction. If the bar code is, however, skewed with respect to a plane perpendicular to the longest dimension of the rectangular aperture, the bar code image in the sensor plane will deteriorate depending on the angle of skew. The rectangular aperture is therefore length-adjustable in order to reach a compromise optimum length for a particular installation format.

If the bar code is printed by intaglio or similar printing methods (the bar actually being comprised of a number of closely adjacent, but distinct, dots) the unit 10 may scan the spaces between the dots and the resulting signal will exhibit significant distortion. By intentionally blurring the image of the bar code by a controlled amount, this potential source of error can be largely avoided. The distance between the lens system 23 can therefore be adjusted by adjustment means 23a so that the bar code to be read will always appear in a region which is intentionally not coincident with the best focus so that imperfections in the label quality are blurred or integrated in the direction along the bar.

The processing circuitry for the unit 10 is schematically shown in FIG. 5. The information contained in the bar code 12, in the form of alternating black and white bars 22, is focused on an image sensor 26 when the bar code 12 is within the field of view 21 of the optical means. The optical means consists of a lens system 23, the adjustable-length rectangular aperture 24, and an optical filter 25 which may be used to enhance the visual image contrast. The image sensor 26 may be a 2048-element high-speed linear image sensor such as Fairchild model CCD143. The analog output of the sensor 26 is supplied to a transition detector 28 via an amplifier 27. The transition detector 28 generates a binary signal corresponding to the analog signal. The output of the transition detector 28 is supplied to a control pulse generator 29 which generates a transition group of pulses including a pulse supplied on line 55 which enables a first counter 30, a memory write pulse supplied on line 56 to a random access memory (RAM)

33, and at the conclusion of the memory write pulse an address increment pulse supplied on line 57 to a second counter 32. The counter 30 is operated by a clock 31, which also operates the image sensor 26.

Many sensors of the type which may be utilized as the image sensor 26 automatically generate an end of scan pulse after exposure of all of the elements in the sensor, in which case the end of scan pulse would be supplied via a line (not shown in FIG. 5) to a microcomputer 34. If the sensor 26 does not have the capability of generating such an end of scan pulse, the microcomputer may simply measure the time elapsed after beginning a scan and generate its own end of scan pulse after the expiration of a predetermined amount of time. Additionally, the circuit shown in FIG. 5 may be equipped with an integrator 40 and an analog to digital converter 41. The integrator 40 averages the level of the video signal from the amplifier 27 which is then converted to a digital signal by the converter 41 and supplied to the microcomputer 34. If the digital value is within a specified minimum-maximum frame, no action is taken. If the digital level is below the minimum, the microcomputer 34 automatically increases the exposure level, and if the digital signal is above the maximum, the microcomputer 34 will decrease the exposure level. The microcomputer 34 receives information from the proximity sensor via line 62a.

From the beginning of a scanning cycle until the end of scan, the RAM 33 is utilized solely as a memory which is loaded with information corresponding to the information contained in the bar code 12. This portion of a cycle is referred to as the loading stage. The loading stage is followed by a processing stage, during which the RAM 33 functions as the working memory for the microcomputer 34. The RAM 33 and the microcomputer 34 are connected by an input/output data bus 38. At the beginning of the processing stage of a cycle, the microcomputer 34 supplies a signal on a control line 37 to a latch 35 and a buffer 36. The microcomputer 34 also supplies a control signal on line 58 to the counter 32 which enables transfer of the contents of the counter 32 to the microcomputer 34 via the buffer 36 and the data bus 38. The latch 35 enables the data bus 38 for microcomputer operations with the RAM 33 during this processing or decoding stage of the cycle. After the microcomputer 34 has decoded the information based on the contents of the RAM 33, the result is sent via a standard serial interface means 58 to an external device or displayed at the display device 39. The interface means 58 may be, for example, an RS232 serial interface unit and also permits programming information to be supplied to the microcomputer 34.

The operation of the circuit shown in FIG. 5 will be explained in greater detail with reference to the voltage/time diagrams shown in FIGS. 6 and 7.

Graph 42 shows exposure pulses supplied by the microcomputer to the sensor 26 to initiate an exposure period $T_{exp}$. The exposure period is divided into a memory loading period $T_1$ and a data processing or decoding period $T_2$ which are defined by the control pulses shown in the graph 43 supplied by the microcomputer 34 via lines 37, 59 and 60. During $T_1$, the counters 32 and 30 are enabled, during which time the RAM 33 is loaded with data, and during the period $T_2$ both counters 32 are inhibited, and the RAM 33 operates as the working memory for the microcomputer 34. In a preferred embodiment, the exposure period $T_{exp}$ is four milliseconds, the memory loading period $T_1$ is one millisecond, and the processing period $T_2$ is three milliseconds.

Figure 6:
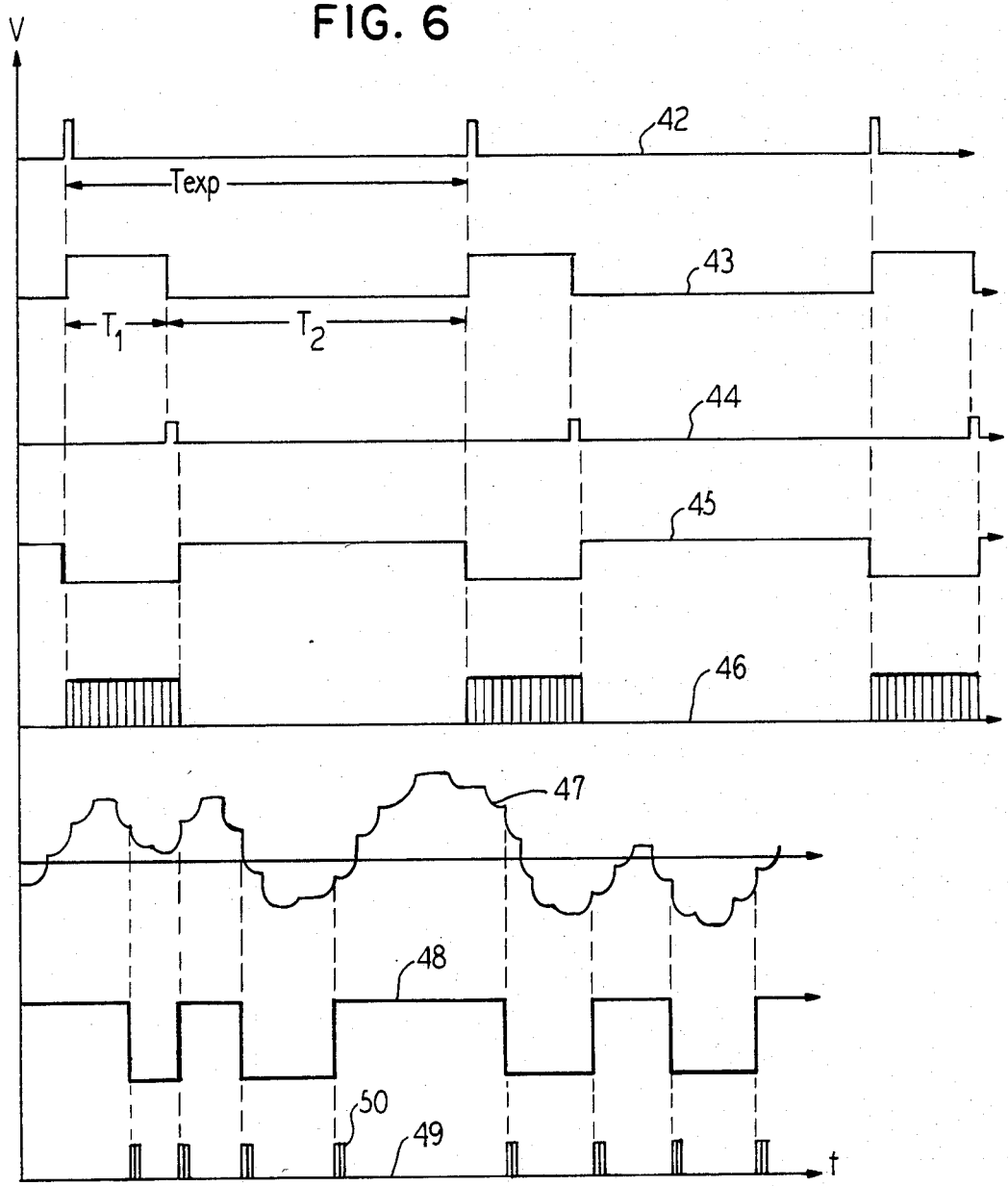
FIG. 6 is a voltage/time diagram showing the control pulses and signals at various locations for the circuit shown in FIG. 5.
Figure 7:
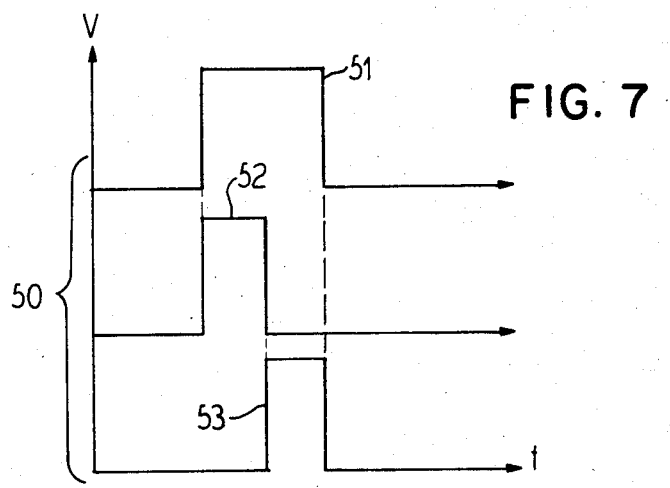
FIG. 7 is an expanded voltage/time diagram for the bottom pulse train shown in FIG. 6.

An example of an analog signal 47 of the type seen at the output of the sensor 26 is shown in FIG. 6. The analog signal 47 is supplied via the amplifier 27 to the edge detector 28, which forms the pulse train referenced at 48 in FIG. 6. The edge detector 28 analyzes the steepness of the positive or negative slope of the analog signal 47 between specified minimum and maximum values and determines that an "edge" occurs when the slope satisfies specified conditions. The signal referenced at 48 is thus a binary signal corresponding to the analog signal 47.

The binary signal 48 is supplied to the control pulse generator 29, which generates a transition pulse group 50 upon the occurrence of each edge in the signal 48. The transition pulse group 50 consists of a data enable pulse 51, a write pulse 52, and an address increment pulse 53, the pulse 53 being formed by subtracting the write pulse 52 from the data enable pulse 51. The pulses comprising the pulse group 50 are shown in expanded form in FIG. 7, however it will be understood that all of the pulses in the transition pulse group 50 have the same base line 49. The data enable pulse 51, which may be of a duration of, for example, 200 ns, is supplied to the counter 30 via the line 55. The write pulse 52 is supplied to the RAM 33 via line 56, and the address increment pulse 53 is supplied to the counter 32 via the line 57. Each of the counters 30 and 32 are eight bit counters, and may be each comprised of two interconnected four bit counters. Each counter 30 and 32 thus can attain a maximum count of 255. Because the camera 10 operates continuously, a "quiet zone" between successive bar codes may occur which is longer than 255 counts, as measured by the clock pulses shown in graph 46. In order to prevent the count of the counter 30 from exceeding 255, the counter 30 has an overflow output 54 which inhibits the supply of clock pulses to the counter 30 so that the contents of the counter 30 cannot be incremented further, and the count thus remains at 255. This insures that the measurement of the widest bar will never exceed 255 clock pulses.

The counter 32 increments the address location of the RAM 33 at which the contents of the counter 30 are to be stored. The counter 32 is incremented by one upon the occurrence of the trailing edge of the pulse 53. Thus, upon each occurrence of an edge in the binary signal 48, the current count of the counter 30 is transferred to the RAM 33 and is stored at the address designated by the count of the counter 32. The counter 30 is then reset to zero and begins counting the time until the next edge occurrence in the signal 48, and upon the occurrence of the next edge, the elapsed count of the counter 30 will again be stored in the RAM 33, but at the next address location by virtue of the increment to the counter 32.

At the end of the memory loading period, a pulse as shown in graph 44 is supplied to the buffer 36 which reads the current count of the counter 32. A latch enable signal as shown in graph 45 is then supplied by the microcomputer on the control line 37 to the latch 35, enabling the data bus 38 so that the RAM 33 can function as the working memory for the microcomputer 34. The enablement of the data bus 38 also permits transfer of the address location stored in the buffer 36 to the microcomputer 34.

The microcomputer 34 executes a number of programmed routines for decoding the data stored in the random access memory 33. A search routine is begun by assuming that the first pulse of a sequence stored in digital format represents a quiet zone and the next few pulses represent a start or stop pattern of the type which are included in standard bar codes. The second or third pulse is selected as a reference "0" and is assigned a reference value $R_o$. Three limit values $L_1$, $L_2$ and $L_3$ are calculated as a function of $R_o$. For example, $L_1$ may equal 0.5 $R_o$, $L_2$ may equal 1.5 $R_o$, $L_3$ may equal 3 $R_o$. The digital values located at the adjacent memory locations are then sorted using the limit values. If the value being checked is less than $L_1$, the value is determined to represent a noise pulse. If the value is between $L_1$ and $L_2$, the value is determined to represent a narrow bar or space. If the value is between $L_2$ and $L_3$, the value is determined to represent a wide bar or space. If the value is greater than $L_3$, the value is determined to represent a quiet zone.

The digital combination of zeros and ones representing narrow and wide bars and spaces is then compared with a library table for the start pattern or a reversed stop pattern (since the bar code may have been read and entered in a direction opposite to the normal reading direction). If a match for one of these patterns is found, a check for the adversary pattern at the opposite end of the data sequence is undertaken at an address location a known number of addresses away from the first check. If still no start or stop pattern is recognized, the RAM pointer is incremented, for example by two address locations, and the search procedure is again undertaken. If still no match can be found the program exits and the data is not further processed.

If the start and stop patterns are found in proper sequence, the intervening data is decoded as described below. If the patterns are found in reverse sequence, meaning the bar code was read backwards, the midpoint of the data sequence is located and the sequence is transposed or "pivoted" about the midpoint, so that it is now in correct reading sequence.

Decoding of the message-carrying data is undertaken using the limit values described above to sort the data at each RAM address as logical zeros and ones. The binary sequences thus obtained are then each compared to a table of library binary sequences representing alphanumeric characters. If no match with any value in the library table is found the RAM pointer is incremented and the search routine is begun again. If a match with a table value is found, a standard "check sum" routine applicable to the type of bar code being read is undertaken. If the "check sum" routine is satisfied, a standard format message is prepared for transmittal via an interface means 58 upon receipt of a transmit request from an external device.

The microcomputer 34 generates an output signal to the interface means 58 or to the display 39, based on the contents of the RAM 33 at the address locations up to the address designated by the counter 32.

Operating in this manner, the camera disclosed herein may undertake, for example, 1000 scans per second, and is therefore well adapted for scanning bar codes on a large number of items rapidly moving through the field of view 21 of the camera 10.

Although modifications and changes may be suggested by those skilled in the art it is the intention of the inventor to embody within the patent warranted hereon all changes and modifications as reasonably and properly come within the scope of his contribution to the art.

I claim as my invention:

1. A remote continuous bar code reading apparatus comprising:
   a non-coherent light means for continuously illuminating a bar code, said bar code being remotely disposed with respect to said camera;
   a light-sensitive image sensor;
   an optical means having a rectangular aperture for focusing light reflected from said bar code onto said image sensor;
   a data loading means connected to said image sensor;
   a data decoding means; and
   a random access memory connected to said data loading means and to said decoding means and being timeshared by said data loading means and said decoding means such that data from said image sensor is initially loaded into said random access memory, said data being utilized by said decoding means for decoding said bar code, and said random access memory subsequently functioning as a working memory for said decoding means.

2. The bar code reading apparatus of claim 1 wherein said rectangular aperture is length-adjustable.

3. The bar code reading apparatus of claim 1 further comprising an integrator connected to said image sensor, a microcomputer in said decoding means for controlling a period of exposure of said image sensor to said light reflected from said bar code, and an analog to digital converter interconnected between said intergrator and said microcomputer, said microcomputer taking no action if the output of said analog to digital converter is within a specified minimum-maximum frame, said microcomputer increasing said period of exposure if said output is below said minimum level and said microcomputer decreasing said period of exposure if said output is above said maximum level.

4. The bar code reading apparatus of claim 1 wherein said decoding means comprises:
   a clock connected to said image sensor for initiating an exposure period;
   an external random access memory;
   a means for converting an analog signal from said image sensor into a binary signal;
   a means for measuring the elapsed time between successive edges of said binary signal;
   a means for loading said elapsed times into said random access memory at specified memory addresses; and
   a microcomputer connected to said random access memory for analyzing the contents thereof at said specified address locations for decoding the information contained in said bar code and for generating an output signal to a display means.

5. The bar code reading apparatus of claim 4 wherein said means for converting an analog signal from said image sensor into a binary signal is a transition detector.

6. The bar code reading apparatus of claim 1 wherein said decoding means comprises:
   a clock connected to said image sensor for controlling a scanning cycle of said bar code by said image sensor;
   a transition detector connected to said image sensor for converting an analog output signal of said image sensor into a binary signal;
   a control pulse generator connected to said edge detector for generating a transition pulse group upon the occurrence of each edge of said binary signal, said transition pulse group comprising a data enable pulse, a write pulse beginning simultaneously with said data enable pulse and terminating before said data enable pulse, and an address increment pulse beginning upon the termination of said write pulse and terminating simultaneously with said data enable pulse;

a first counter connected to said control pulse generator for receiving said data enable pulse therefrom, and connected to said clock for receiving a series of clock pulses therefrom;

a second counter connected to said control pulse generator for receiving said address increment pulse therefrom;

a random access memory having a data input connected to the output of said first counter, an address input connected to the output of said second counter, and an enabling input connected to said control pulse generator for receiving said write pulse therefrom;

said first counter being incremented by said series of clock pulses beginning with the occurrence of an edge of said binary signal until the occurrence of the next successive edge of said binary signal, the count of said first counter being stored in said random access memory upon the occurrence of said write pulse at an address determined by the count of said second counter, and said address increment pulse incrementing the count of said second counter;

a microcomputer connected to said random access memory by a data bus;

a latch for enabling said data bus for permitting transfer of information between said random access memory and said microcomputer upon a signal from said microcomputer;

a buffer interconnected between said second counter and said data bus and having a control line connected to said microcomputer, said buffer reading the contents of said second counter upon the occurrence of a signal from said microcomputer on said control line whereby upon completion of a scanning cycle said microcomputer utilizes the data stored in said random access memory for decoding said bar code for display on said display means, said microcomputer utilizing said random access memory as a working memory.

7. The bar code reading apparatus of claim 6 wherein said first counter is an eight bit counter and said first counter having a means for inhibiting further increase of the count of said first counter after said count reaches 255.

8. The bar code reading apparatus of claim 1 wherein said bar code is on a label on an item moving past said apparatus, and wherein said apparatus further comprises an external proximity sensor connected to said decoding means for providing a signal thereto identifying an end of said item.

9. The bar code reading apparatus of claim 1 further comprising a visual display means connected to said decoding means for displaying the information contained in said bar code decoded by said microcomputer.

10. The bar code reading apparatus of claim 1 wherein said non-coherent light means is at least one incandescent lamp.

11. The bar code reading apparatus of claim 1 further comprising an interface face means connected to said decoding means for transferring decoded information to an external device.

12. The bar code reading apparatus of claim 1 wherein said data loading means comprises:

a means connected to said image sensor for converting an analog signal from said image sensor into a binary signal;

a means for measuring the time between successive level transitions of said binary signal; and a means for loading data representing the elapsed time between each transition into said random access memory at a series of memory locations.

13. The bar code reading apparatus of claim 12 further comprising a means for transferring said memory locations to said decoding means for identifying the memory locations of data in said random access memory to be used for decoding said bar code.

14. The bar code reading apparatus of claim 12 wherein said means for measuring the elapsed time between successive level transitions of said binary signal is a clock-controlled counter connected to said random access memory.

15. A method for operating a continuous bar code reader having a field of view for decoding a bar code remotely disposed with respect to said reader comprising the steps of:

continually moving a plurality of different bar codes through the field of view of said reader;

continuously illuminating said field of view of said reader with non-coherent light;

focusing light reflected from said bar code onto an image sensor through a rectangular aperture;

cyclicly continuously scanning said bar codes with said image sensor;

deriving a binary signal from the output of said image sensor;

loading an external random access memory with information corresponding to the time between successive level transitions of said binary signal during a first stage of a scanning cycle; and utilizing said random access memory during a second stage of said scanning cycle as a working memory for a microcomputer for decoding the data stored in said random access memory during said first stage of said scanning cycle.

16. The method of claim 15 comprising the additional steps of:

comparing the output of said image sensor with a specified minimum-maximum frame;

increasing the exposure level of said image sensor if said output is below said minimum; and decreasing said exposure level of said image sensor if said output is above said maximum.

17. The method of claim 15 comprising the additional steps of:

generating a group of transition pulses upon the occurrence of each transition of said binary signal;

incrementing a first counter with a series of clock pulses for the period between successive transition transitions of said binary signal;

utilizing first and second ones of said control transition pulses for enabling the writing of the count of said first counter into said random access memory and for transferring the count of said first counter into said random access memory at an address location determined by the count of a second counter; and utilizing a third of said control transition pulses to increment the count of said second counter upon each occurrence of an edge of said binary signal.

18. The method of claim 17 comprising the additional step of reading the count of said second counter with a buffer memory after said image sensor completes a scan of said bar code and transferring the contents of said buffer memory to a microcomputer for idenifying the addresses of said random access memory at which data is located for use by said microcomputer in decoding said bar code.

* * * * *